GEORGE ECKERT, OF CHARLESTOWN, OHIO.

*Letters Patent No. 85,650, dated January 5, 1869.*

IMPROVED COMPOUND FOR CURE OF FOOT-ROT IN SHEEP.

The Schedule referred to in these Letters Patent and making part of the same.

*To all whom it may concern:*

Be it known that I, GEORGE ECKERT, of Charlestown, in the county of Portage, and State of Ohio, have invented a certain new and useful Compound for Treating the Diseased Feet of Sheep, Horses, and other stock, and for the treatment of ulcers, galls, &c.; and I do hereby declare that the following is a full and complete description of the ingredients composing the compound, and the manner of compounding the same.

Pine-tar, one quart; sulphate of copper, one pound; dry white lead, one pound; calomel, six ounces.

The sulphate of copper is first finely pulverized, the other ingredients are then added, and all thoroughly mixed together, forming a kind of paste, about the consistency of ordinary bread-dough.

In case of a diseased hoof, the foot is first trimmed off. The composition is then applied to the afflicted parts, the result of which is to destroy the morbid action, and restore a healthy circulation through the foot.

It is also a remedial agent for contracted hoofs, producing a relaxation and healthy growth.

In galls, ulcers, &c., it destroys all morbid secretions, and produces a healthy granulation.

What I claim as my invention, and desire to secure by Letters Patent, is—

A remedial compound, composed of the above-named ingredients, and combined as set forth, for the purpose described.

GEORGE ECKERT.

Witnesses:
W. H. BURRIDGE,
K. COON.